(12) United States Patent
Ozkan et al.

(10) Patent No.: US 7,947,251 B2
(45) Date of Patent: May 24, 2011

(54) CATALYST FOR HYDROGEN PRODUCTION FROM WATER GAS SHIFT REACTION

(75) Inventors: Umit S. Ozkan, Worthington, OH (US); Xueqin Wang, Louisville, KY (US); Lingzhi Zhang, Columbus, OH (US); Sittichai Natesakhawat, Pittsburgh, PA (US)

(73) Assignee: The Ohio State University Research Foundation, Columbus, OH (US)

( * ) Notice: Subject to any disclaimer, the term of this patent is extended or adjusted under 35 U.S.C. 154(b) by 533 days.

(21) Appl. No.: 11/917,509

(22) PCT Filed: Jun. 15, 2006

(86) PCT No.: PCT/US2006/023355
§ 371 (c)(1),
(2), (4) Date: Apr. 18, 2008

(87) PCT Pub. No.: WO2006/138485
PCT Pub. Date: Dec. 28, 2006

(65) Prior Publication Data
US 2008/0233045 A1 Sep. 25, 2008

Related U.S. Application Data

(60) Provisional application No. 60/690,754, filed on Jun. 15, 2005.

(51) Int. Cl.
*C01B 3/12* (2006.01)
*B01J 23/00* (2006.01)
*B01J 21/00* (2006.01)
*B01J 20/00* (2006.01)

(52) U.S. Cl. ........ 423/655; 502/327; 502/331; 502/332; 502/336; 502/338; 502/345; 502/346; 502/355; 502/415; 502/439

(58) Field of Classification Search .................. 502/327, 502/331, 332, 336, 338, 345, 346, 355, 415, 502/439; 423/655
See application file for complete search history.

(56) References Cited

U.S. PATENT DOCUMENTS

| | | | | | |
|---|---|---|---|---|---|
| 3,183,588 | A | * | 5/1965 | Pruna | 148/282 |
| 4,233,180 | A | * | 11/1980 | Hausberger et al. | 252/373 |
| 4,402,745 | A | * | 9/1983 | Ray et al. | 148/332 |
| 5,830,425 | A | * | 11/1998 | Schneider et al. | 423/437.2 |
| 6,121,188 | A | * | 9/2000 | Breitscheidel et al. | 502/301 |
| 6,309,758 | B1 | * | 10/2001 | Schmidt | 428/570 |
| 6,589,909 | B2 | * | 7/2003 | Yoshimura et al. | 502/327 |

(Continued)

OTHER PUBLICATIONS

Australian Office Action dated Jun. 4, 2010 pertains to Australian Appln. Serial No. 2006259326.

(Continued)

*Primary Examiner* — Cam N Nguyen
(74) *Attorney, Agent, or Firm* — Dinsmore & Shohl LLP (57) ABSTRACT

Fe—Al—Cu catalysts have numerous industrial applications, for example, as catalysts in a water gas shift reactor. A method of producing a Fe—Al—Cu catalyst comprises the steps of providing an organic iron precursor, dissolving the organic iron precursor in a solvent solution, adding an aqueous solution comprising aluminum nitrate and copper nitrate to the organic iron pre-cursor-solvent solution, precipitating a gel comprising Fe—Al—Cu by adding a base, and drying the gel to form the Fe—Al—Cu catalyst.

8 Claims, 10 Drawing Sheets

U.S. PATENT DOCUMENTS

| | | | | |
|---|---|---|---|---|
| 6,596,423 | B2 * | 7/2003 | Mahajan | 429/420 |
| 6,723,298 | B1 * | 4/2004 | Baumann et al. | 423/437.2 |
| 6,777,452 | B2 * | 8/2004 | Zhou et al. | 518/713 |
| 6,794,331 | B2 * | 9/2004 | Ostgard et al. | 502/301 |
| 7,094,729 | B2 * | 8/2006 | Adkins et al. | 502/301 |
| 7,179,442 | B2 * | 2/2007 | Hagemeyer et al. | 423/655 |
| 7,527,781 | B2 * | 5/2009 | Nielsen et al. | 423/650 |
| 2002/0172836 | A1 * | 11/2002 | Takayama et al. | 428/553 |

OTHER PUBLICATIONS

Suber et al, "Synthesis, Morphology, and Magnetic Characterization of Iron Oxide Nanowires and Nanotubes" J. Phys. Chem. B 2005, 109, pp. 7103-7109.

Carneiro de Araujo et al, "An environmental friendly dopant for the high-temperature shift catalyst" Catalysis Today 62, 2000, pp. 201-207.

* cited by examiner

CO conversion in the water-gas shift reaction over reduced sol-gel Fe-Al-Cu catalysts prepared at different pH values.

Fig. 9

CATALYST FOR HYDROGEN PRODUCTION FROM WATER GAS SHIFT REACTION

The invention relates generally to a catalyst for hydrogen production from the water-gas shift reaction, and is specifically directed to a Fe—Al—Cu catalyst used to produce hydrogen in a water gas shift reaction.

The water-gas shift reaction is of central importance in the industrial production of hydrogen, ammonia, and other bulk chemicals utilizing syngas. Using catalysts in water gas shift reactors (WGS) is well known in the art. However, current commercial catalysts, such as Fe—Cr, are toxic to humans and the environment, exhibit low activity, etc. As a result, there is a continued need for improved WGS catalysts that exhibit better activity in the WGS, and reduce costs and environmental hazards.

In accordance with a first embodiment of the present invention, a method of producing a Fe—Al—Cu catalyst is provided. The method comprises the steps of providing an organic iron precursor, dissolving the organic iron precursor in a solvent solution, adding an aqueous solution comprising aluminum nitrate and copper nitrate to the organic iron precursor-solvent solution, precipitating a gel comprising Fe—Al—Cu by adding a base, and drying the gel to form the Fe—Al—Cu catalyst.

In accordance with a second embodiment of the present invention, a method of producing hydrogen by a water gas shift reaction is provided. The method comprises the steps of providing an Fe—Al—Cu catalyst, feeding a gaseous stream comprising carbon monoxide (CO), and steam ($H_2O$), and producing hydrogen ($H_2$) and $CO_2$ by oxidizing the CO with $H_2O$ in the presence of the Fe—Al—Cu catalyst at a temperature of about 250 to about 400° C.

In accordance with a third embodiment of the present invention, a catalyst composition comprising Fe, Al, and Cu and substantially free of Cr is provided. The catalyst composition comprises a molar ratio of Fe/Cu of about 5:1 to about 25:1, and a molar ratio of Fe/Al of about 5:1 to about 15:1.

These and additional features and advantages provided by the embodiments of the present invention will be more fully understood in view of the following detailed description, and the appended claims.

The following detailed description can be best understood when read in conjunction with the following drawings.

The present invention is directed to a novel catalyst formulation, an Fe—Al—Cu catalyst The Fe—Al—Cu catalyst may be produced by numerous methods known to one of ordinary skill in the art, for example, co-precipitation-impregnation or impregnation; however, a modified sol gel method, in accordance with one embodiment of the present invention, has produced an Fe—Al—Cu catalyst with superior properties e.g. improved $H_2$ conversion in a water gas shift system.

The sol-gel method of producing a Fe—Al—Cu catalyst comprises the steps of providing an organic iron precursor, and dissolving the organic iron precursor in a solvent solution. In one exemplary embodiment, the organic iron precursor is an iron (III) organic complex, such as iron (III) acetylacetonate $(C_3H_7O_2)_3Fe$; however, other suitable organic iron precursors operable to dissolve in a solvent solution are also contemplated herein. The solvent may comprise any solvent, for example, an alcohol solvent, operable to dissolve an organic iron precursor such as iron (III) acetylacetonate. In an exemplary embodiment, the solvent is ethanol. The amount of ethanol and organic iron precursor added to the solution depends on the concentrations desired. In one exemplary embodiment, 1 mol of organic iron precursor e.g. iron (III) acetylacetonate is added to about 2 to 8 liters of solvent e.g. ethanol. To accelerate the dissolution of the organic iron precursor, the ethanol solution may be stirred during and after the addition of the organic iron precursor. The dissolution may occur at a various temperature familiar to one of ordinary skill in the art, e.g. from about 25 to about 70° C.

The method further comprises adding an aqueous solution comprising aluminum nitrate and copper nitrate to the organic iron precursor-solvent solution. In an exemplary embodiment, the aqueous solution is added dropwise. In addition to the aluminum and copper nitrates, additional metal-based promoter precursors are contemplated herein. In one embodiment, the aqueous solution is produced by dissolving a desired amount of aluminum and copper in water at about room temperature. The amount of aluminum and copper nitrates depends on the desired molar ratios of Fe/Cu and Fe/Al. These molar ratios, as will be shown in greater detail below, impact the catalyst's mechanical properties, such as conversion and $H_2$ production. The sol-gel method further includes the steps of precipitating a gel comprising Fe—Al—Cu by adding a base, and then drying the gel to form the Fe—Al—Cu catalyst. The base may comprise any base capable of precipitating Fe—Al—Cu catalyst from solution, and also capable of adjusting the pH of the solution prior to precipitation. In one embodiment, the base comprises a strong base, for example, an alkali metal hydroxide solution, such as NaOH. The amount of base added depends on the final pH values needed. In one exemplary embodiment, NaOH having a concentration of about 0.1 to about 1 mol/L is used to adjust the pH.

Figure 8:
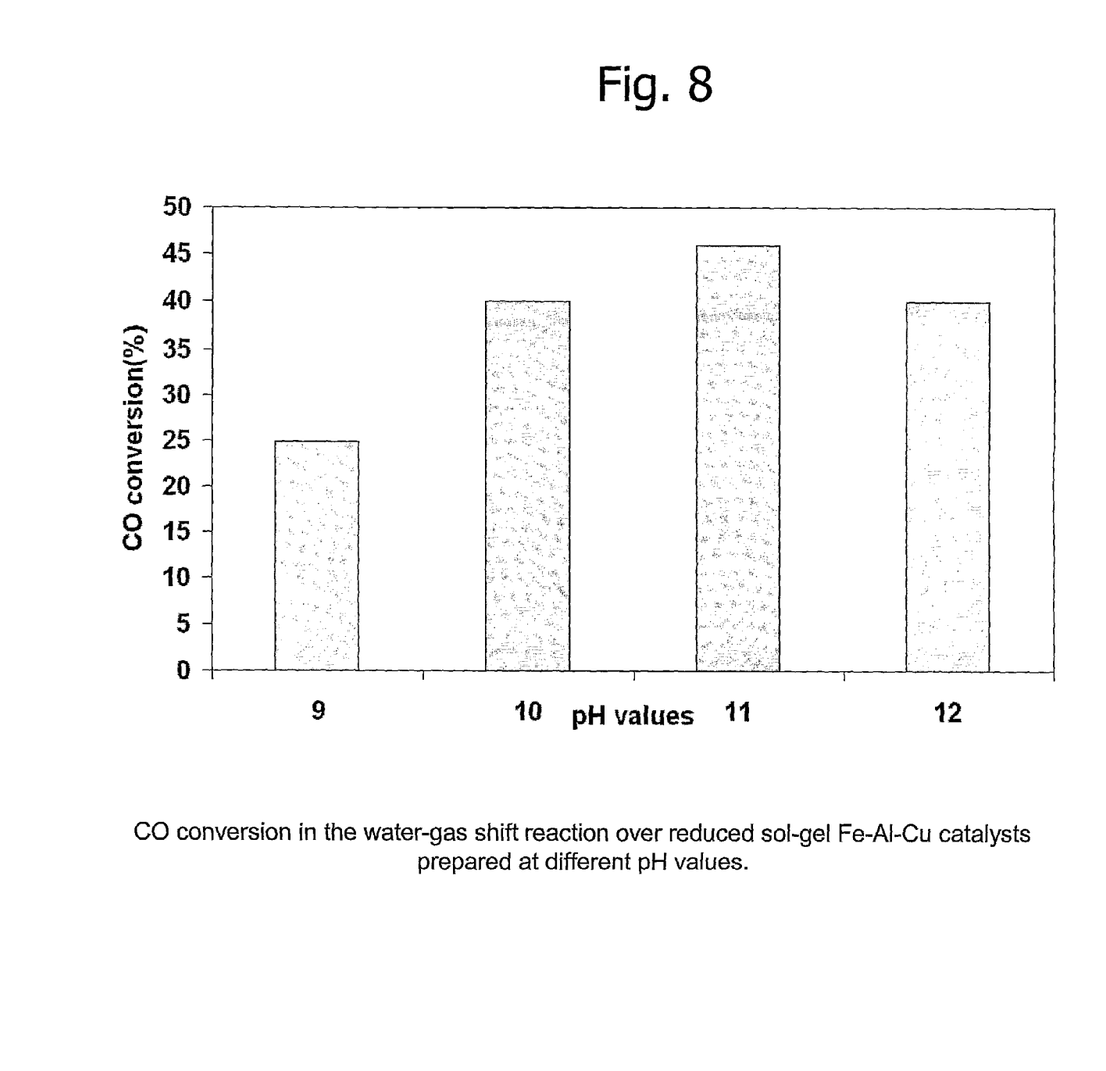
FIG. 8 is a bar graph illustrating the performance of Fe—Al—Cu catalysts at various pH values according to one or more embodiments of the present invention.

According to further embodiments, the method may comprise additional steps configured to optimize the Fe—Al—Cu catalyst produced. In one embodiment, the base and an acid are used to adjust the pH of the solution. Many suitable acids, such as $HNO_3$, are possible. In an exemplary embodiment, the pH of the solution is acidic prior to precipitation, and is made basic when the base e.g. NaOH is added to the solution. In a further exemplary embodiment, the pH is about 9-12, or about 11. Referring to FIG. 8, a sol-get catalyst having a pH of 11 produces the best conversion for the water gas shift reaction.

Additional method steps may include stirring the precipitated gel for about 15 minutes to about one hour, and centrifuging the precipitated gel. In an exemplary embodiment, the precipitate was stirred for 30 minutes, and then centrifuged at about 1200 rpm for about 5 min. Other centrifuge speeds and times familiar to one skilled in the art are contemplated herein. The method may further include rinsing the precipitated gel with distilled water to remove the metal cations, e.g. Na+, of the base.

In accordance with an exemplary embodiment of the aforementioned drying step, the precipitated gel may be dried overnight in an oven at 110° C. The dried gel may then be grinded into a powder. One of ordinary skill in the art would know that various particle sizes are possible. In one embodiment, the particle size ranges from about 10 to about 100 nm. The method may further include a calcination step, wherein the dried gel or powder is heated under temperatures of about 400 to about 500° C. for about 2 to about 6 hours. For example, and not by way of limitation, the powder may be calcined under air at 450° C. for 4 hr, wherein the calcinations temperature defines a ramp rate of about 2.5° C./min.

Figure 9:
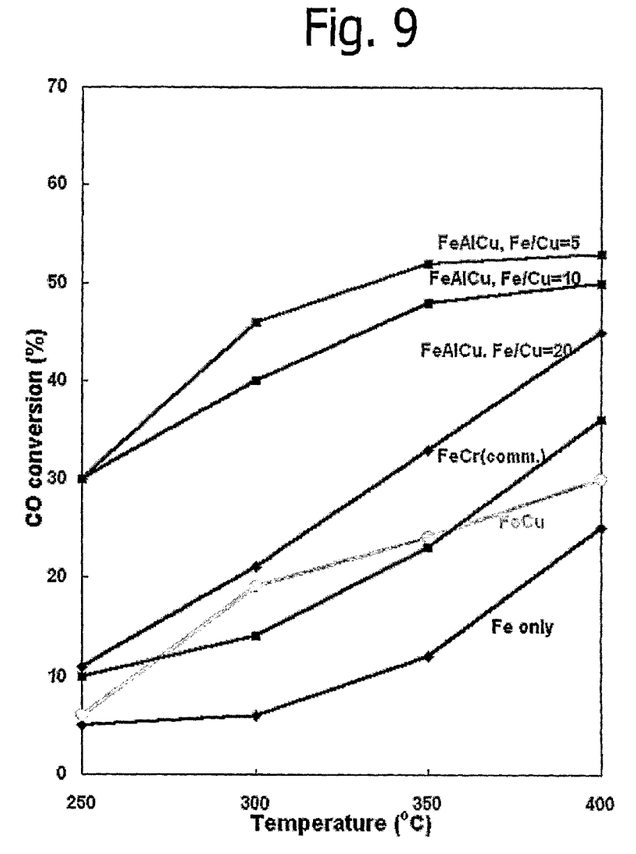
FIG. 9 is a graphical illustration of the CO conversion (%) of multiple catalysts at various temperatures according to one or more embodiments of the present invention.

In a few exemplary embodiments, the Fe, Al, Cu precursors are precisely added to achieve a final Fe—Al—Cu catalyst having a molar ratio of Fe/Cu of about 5:1 to about 25:1, and a molar ratio of Fe/Al of about 5:1 to about 15:1. In a further exemplary embodiment, the catalyst has an Fe/Al molar ratio of about 10:1, and an Fe/Cu molar ratio of about 20:1. Additionally, the Fe—Al—Cu catalyst is substantially free of chromium (Cr), which, as stated above, has a known toxic effect. Referring to another embodiment as shown in FIG. 9, a sol-gel catalyst with a lower Fe/Cu molar ratio e.g. 5:1, may convert more CO and thereby produce more $H_2$ than a sol-gel catalyst with a lower Fe/Cu molar ratio e.g. 10:1 and 20/1.

The Fe—Al—Cu catalyst, although operable in numerous industrial applications, is configured to act as a catalyst in a water gas shift reactor (WGS). The Fe—Al—Cu is configured to catalyze the following water gas shift reaction:

$$CO(g)+H_2O(g) \leftarrow\rightarrow CO_2(g)+H_2(g)$$

In operation, the WGS receives a gaseous stream comprising carbon monoxide (CO), and steam ($H_2O$). In many industrial applications, a reactor, such as a gasifier, a steam reformer, a combustor, etc, may produce this feed to the WGS. Upon delivering the feed to the WGS, the carbon monoxide and steam react to produce $CO_2$ and $H_2$ by oxidizing the CO with $H_2O$ in the presence of the Fe—Al—Cu catalyst. The water gas shift reactor and the Fe—Al—Cu catalyst therein are configured to operate at various temperatures. In one embodiment, the temperature may range from about 250 to about 400° C.

The $H_2$ produced by the WGS may be utilized in various applications known to one skilled in the art. In one exemplary embodiment, the $H_2$ product is fed to a fuel cell, wherein the $H_2$ is utilized in the production of electric power. The fuel cell may comprise any suitable fuel cell as would be familiar to one of ordinary skill in the art, for example, solid oxide fuel cells, and proton exchange membrane fuel cells.

The Fe—Al—Cu catalyst, especially the Fe—Al—Cu catalyst produced by the modified sol-gel procedure, demonstrates superior mechanical properties. In one embodiment, the Fe—Al—Cu catalyst may yield a CO conversion of about 30% to about 60% by wt. Due to this high conversion, the Fe—Al—Cu catalyst may reduce the steam ($H_2O$) requirements of the WGS. In one embodiment, the $H_2O$ and CO are provided at a molar ratio of about 1:1, wherein water gas shift reactors traditionally require steam to be fed in excess. Furthermore, the catalyst demonstrates higher activity at low temperatures, for example, 3 times the activity, and is more stable at higher temperatures. In contrast, Fe—Cr catalysts comprise low activity, thus requiring higher temperature of operation, and increased steam requirements and reactor sizes. Because the Fe—Al—Cu catalyst is effective at both high and low temperatures, this versatility eliminates the need to have two or more WGS reactors i.e., a high temperature WGS and a low temperature WGS, in order to produce the desired $H_2$ conversion. It further minimizes the reactor size required, because steam is fed in a 1:1 molar ratio with the CO, thereby reducing costs. Utilizing one WGS instead of multiple WGS also minimizes side reactions, for example, methyl ($CH_3$) side reactions.

Figure 7:
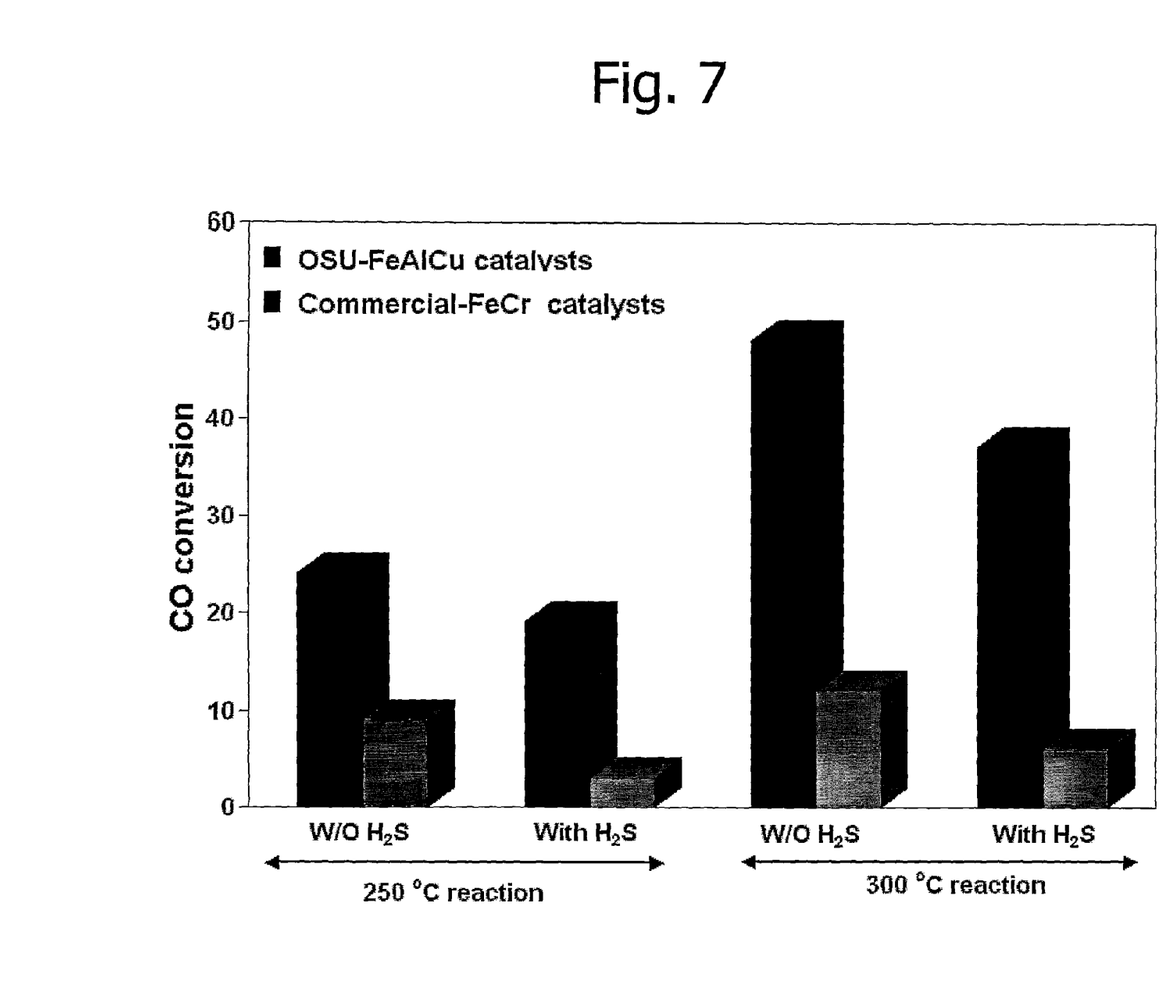
FIG. 7 is a bar graph comparing the performance of Fe—Al—Cu catalysts to commercial Fe—Cr catalysts when exposed to $H_2S$ according to one or more embodiments of the present invention.

Moreover, the Fe—Al—Cu catalyst demonstrates other improved properties in comparison to the Fe—Cr commercial catalyst. For instance, the Fe—Al—Cu is less expensive than the Fe—Cr catalyst, 50% less in some cases. The costs of shift catalysts are significant considering that a WGS reactor currently represents the largest volume of any catalyst in a fuel processor. Additionally, Fe—Al—Cu is an environmentally friendly benign catalyst at high temperatures as compared to the Fe—Cr catalyst, which is toxic at high temperatures. Referring to FIG. 7, Fe—Al—Cu demonstrates a higher Sulfur resistance as compared to the Fe—Cr catalyst. The commercial catalyst performance upon contacting the $H_2S$, whereas the Fe—Al—Cu catalysts are impacted but not nearly to the same extent.

Figure 1:
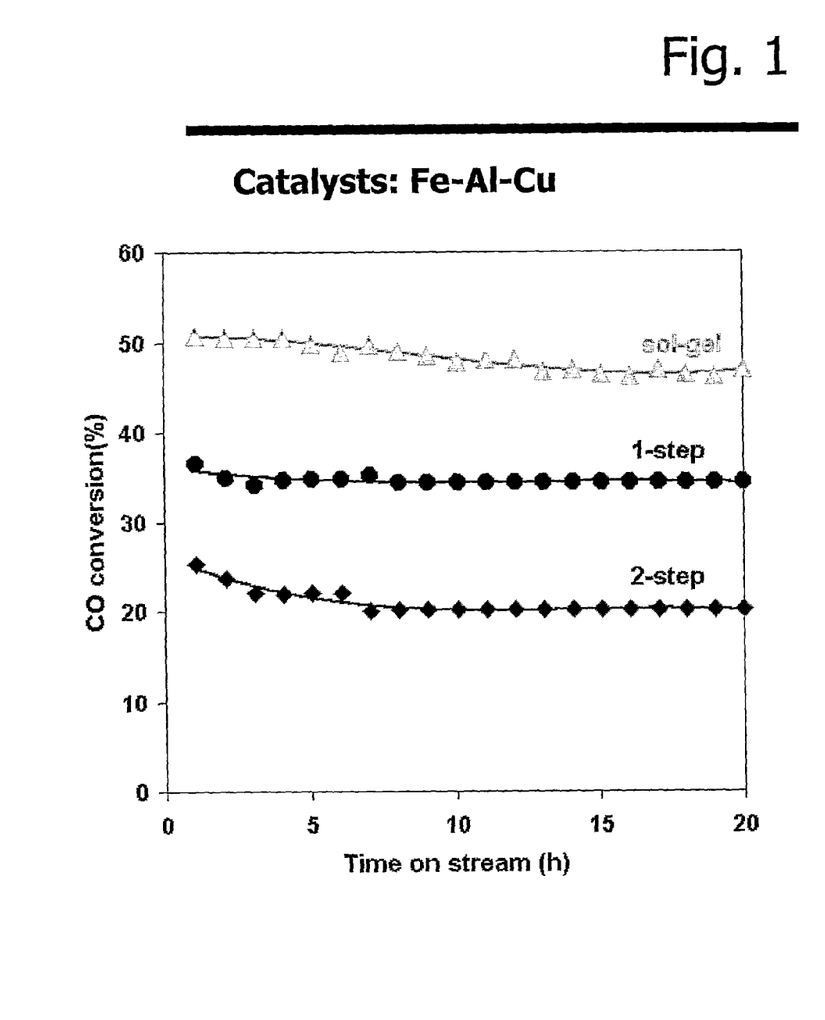
FIG. 1 is a graphical illustration comparing the CO conversion (%) over time of sol-gel Fe—Al—Cu catalysts and Fe—Al—Cu catalysts produced by co-precipitation (1-step) and co-precipitation-impregnation (2-step) according to one or more embodiments of the present invention.
Figure 2:
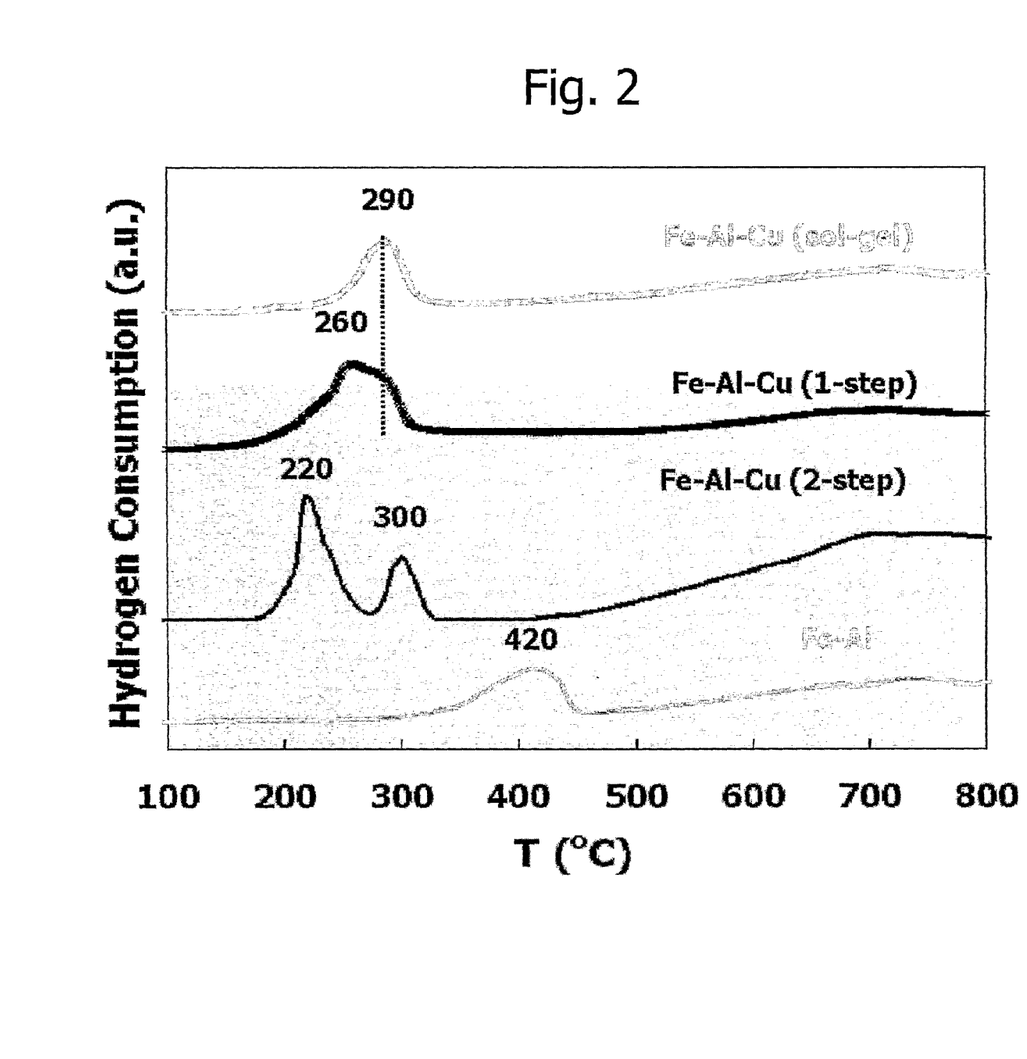
FIG. 2 is a graphical illustration comparing the hydrogen consumption of sol-gel Fe—Al—Cu catalysts and other catalysts at various temperatures according to one or more embodiments of the present invention.

The following experimental examples generally demonstrate the improved properties of Fe—Al—Cu catalysts, and specifically demonstrate the improved properties of sol-gel Fe—Al—Cu catalysts. FIGS. 1 and 2 compare the performance of Fe—Al—Cu catalysts against the performance of Fe—Al—Cu catalysts produced by co-precipitation-impregnation (2 step) or co-precipitation (1 step) techniques. The synthesis variables and calcination procedures were the same for all three methods.

Referring to FIG. 1, the three Fe—Al—Cu catalysts, which were produced by co-precipitation-impregnation (2 step) or co-precipitation (1 step) and sol-gel, were reduced in situ under coal gas (31% CO, 15% $CO_2$, 23% $H_2$, 31% $H_2O$, balance $N_2$) at 350° C. for 2 hr. As shown, steady-state WGS activity at 400° C. is seen to increase in the following order: 2-step<1-step<sol-gel. Additional studies of catalytic activity as a result of sol-gel preparation were conducted using Temperature-programmed reduction (TPR), X-ray photoelectron spectroscopy (XPS), and Temperature-programmed reaction (TPReaction).

Temperature-programmed Reduction (TPR)

TPR of Fe—Al—Cu catalysts was conducted to study change in reducibility upon preparation methods. Initially, 100 mg of catalysts was placed in a ¼ in. O.D. quartz U-tube reactor. Catalysts were re-calcined under air at 450° C. for 1 hr. followed by cooling to room temperature under $N_2$. 10% $H_2/N_2$ was used as a reducing agent. The temperature of the catalysts was raised using a ramping rate of 10° C./min. to 800° C. and held for 10 min.

Referring to FIG. 2, a reduction peak at 300° C. observed with the 2-step catalyst was assigned to the reduction of hematite to magnetite. An additional feature at 220° C. was due to the reduction of copper oxide to metallic copper. A single reduction peak at 260° C. with a shoulder is seen over the 1-step catalyst while a symmetrical reduction feature at 290° C. is obtained with the sol-gel catalyst. This demonstrates that copper exists within the iron oxide lattice as a result of sol-gel preparation.

An improvement in WGS activity of Fe—Al catalysts upon Cu promotion is related to reducibility of magnetite as indicated by a shift of the peak maximum associated with the reduction of hematite to magnetite from 420 to below 300° C. Copper enhances electron transfer capabilities upon sol-gel preparation, thus the copper produces higher WGS activity by modifying the electronic properties of the sol gel catalyst.

X-ray Photoelectron Spectroscopy (XPS)

Figure 3:
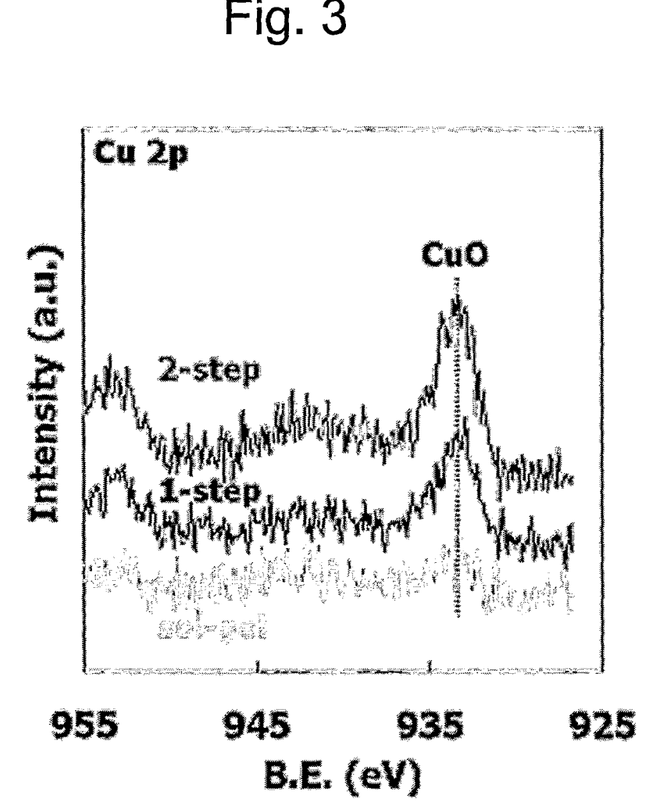
FIG. 3 is a graphical illustration produced by an XPS spectrometer comparing the Cu 2*p* spectra of calcined sol-gel Fe—Al—Cu catalysts and Fe—Al—Cu catalysts produced by co-precipitation (1-step) and co-precipitation-impregnation (2-step) according to one or more embodiments of the present invention.

XPS of calcined Fe—Al—Cu catalysts was conducted with an AXIS Ultra XPS spectrometer operated at 14 kV and 10 mA. Spectra were corrected using the C 1s signal located at 284.5 eV. As shown in FIG. 3, copper oxide is seen at 933.3 eV on all catalysts. However, the Cu 2p spectrum of the sol-gel catalyst is less intense compared to 1-step and 2.-step catalysts. Relative surface concentrations were further quantitatively determined using XPS peak areas and atomic sensitivity factors. After calcination at 450° C., Fe/Cu molar ratio of the catalysts increases in the following order: 2-step<1-step<sol-gel (see Table I below).

TABLE 1

| Method | Fe/Cu |
| --- | --- |
| 2-step | 9.7 |
| 1-step | 16.3 |
| Sol-gel | 21.6 |

This suggests that the outer surface of the 2-step catalyst is most enriched in copper. On the other hand, a higher amount of copper resides in the hematite structure as indicated by a larger value of Fe/Cu (close to the as-prepared ratio which is 20) obtained with sol-gel catalyst. This further demonstrates the beneficial effect of copper promotion in modifying the electronic properties of sol-gel Fe—Al—Cu catalysts.

Temperature-programmed Reaction (TPReaction)

TPReaction experiments were carried out to study redox characteristics of Fe—Al—Cu catalysts prepared by three different methods. First, catalysts (50 mg) were loaded into a ¼ inch. O.D. quartz reactor and were pretreated under 30 cm³ (STP)/min of He at 450° C. for 30 min. with a ramping rate of 10° C./min. Subsequently, catalysts were reduced in situ under 20% $H_2$/He for 2 hr at 350° C. followed by cooling to room temperature under He. $H_2O$-TPReaction experiments were initiated by raising the catalyst temperature to 400° C. with a ramp rate of 5° C./min under 2% $H_2O$/He flow (8 cm³ (STP)/min) and 0.5% CO/He flow (32 cm³ (STP)/min). Product gases coming out of the reactor were analyzed with a Thermo Finnigan TRACE DSQ. The catalysts were cooled down to room temperature after they were held constant at 400° C. for 30 min. CO-TPReaction experiments were then conducted under 0.5% CO/He flow (32 cm³ (STP)/min) using the same temperature program as $H_2O$ TPReaction. Similar experiments with a reverse order of TPReactions, in which CO was introduced first followed by $H_2O$ exposure, were also performed.

Figure 4A:
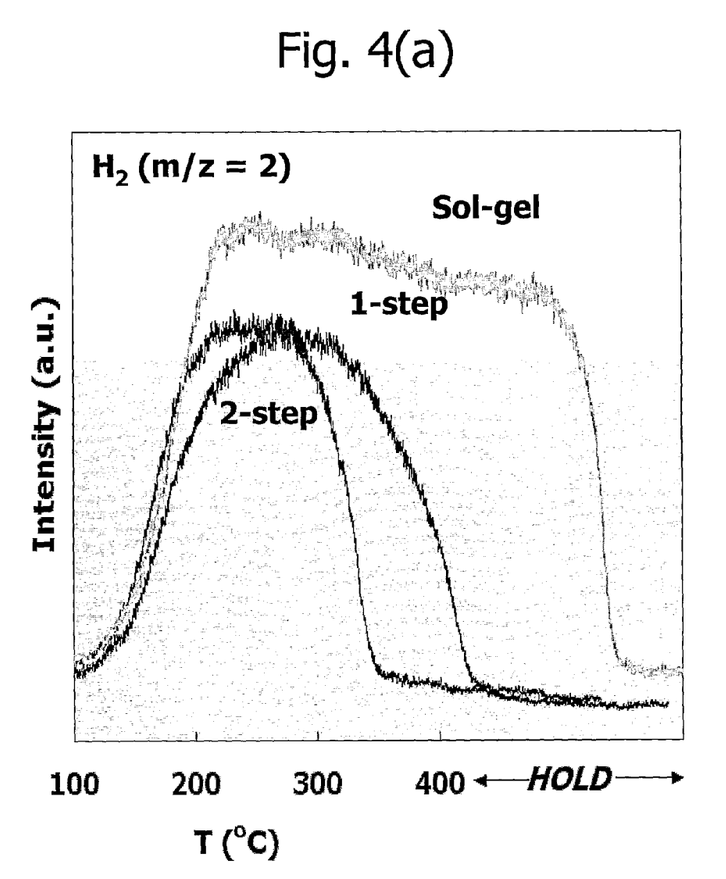
FIG. 4*a* is a graphical illustration illustrating the TPReaction experiment, which compares the intensity of sol-gel Fe—Al—Cu catalysts and Fe—Al—Cu catalysts produced by co-precipitation (1-step) and co-precipitation-impregnation (2-step) according to one or more embodiments of the present invention.
Figure 4B:
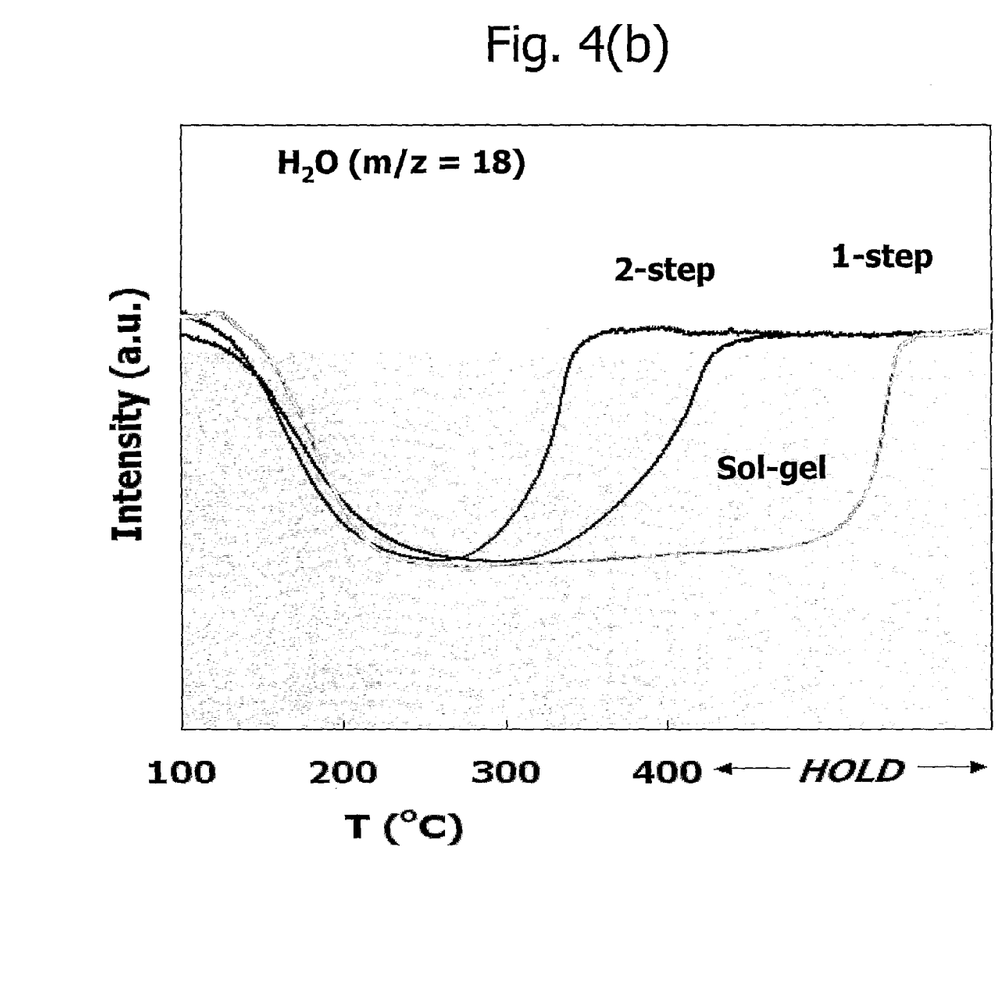
FIG. 4*b* is a graphical illustration illustrating another TPReaction experiment, which compares the intensity of sol-gel Fe—Al—Cu catalysts and Fe—Al—Cu catalysts produced by co-precipitation (1-step) and co-precipitation-impregnation (2-step) according to one or more embodiments of the present invention.

FIG. 4 shows the evolution of $H_2$ (m/z=2) and the consumption of $H_2O$ (m/z=18) observed with three different Fe—Al—Cu catalysts during $H_2O$-TPReaction. An increase in the hydrogen evolution profile is accompanied by a decrease in $H_2O$ concentration. This suggests that $H_2$ is produced as the catalyst surface is oxidized by $H_2O$. The amount of the evolution of $H_2$ from $H_2O$ oxidation is highest with sol-gel catalyst. This is due to the fact that sol-gel catalysts contain a larger amount of oxygen vacancies to react with $H_2O$ to form $H_2$ compared to 1-step and 2-step catalysts.

Figure 5:
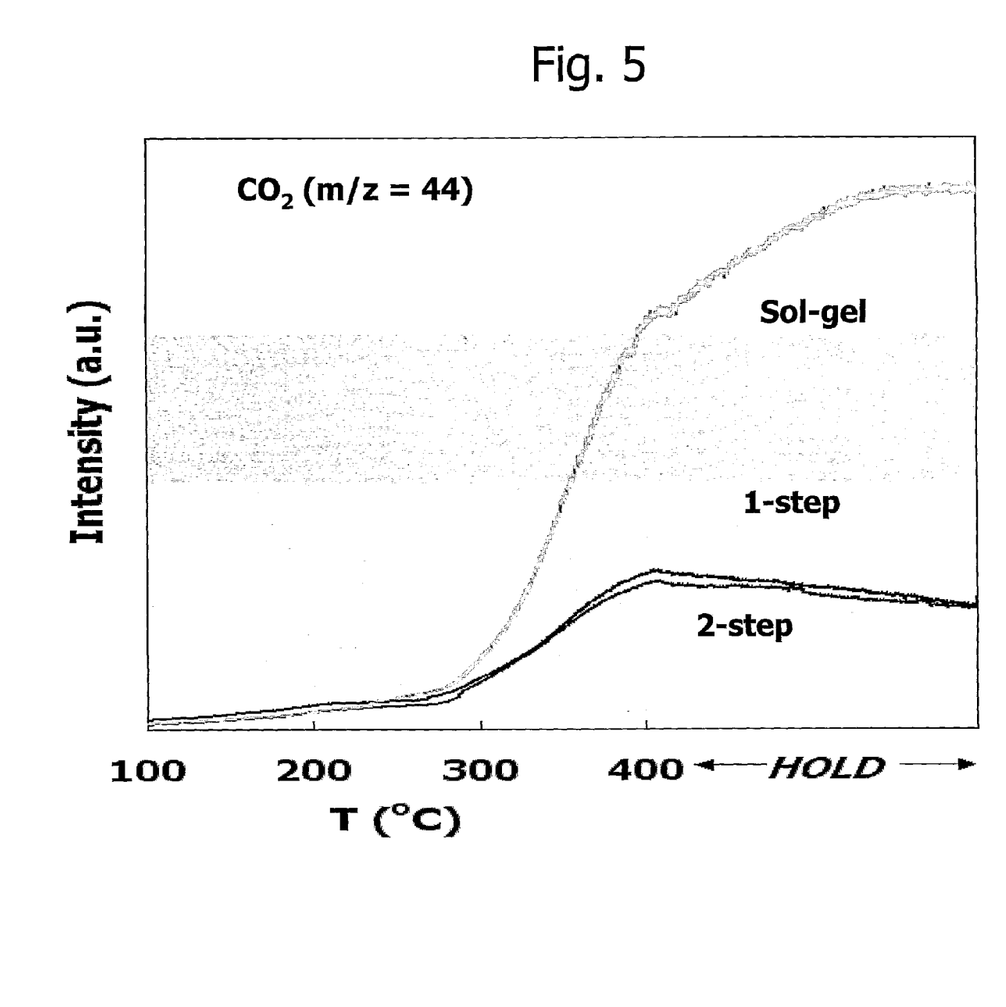
FIG. 5 is a graphical illustration of yet another TPReaction experiment, which compares the intensity of sol-gel Fe—Al—Cu catalysts and Fe—Al—Cu catalysts produced by co-precipitation (1-step) and co-precipitation-impregnation (2-step) according to one or more embodiments of the present invention.

A 0.5% CO/He flow was then introduced to the catalysts after $H_2O$-TPReaction was complete. FIG. 5 shows the evolution of $CO_2$ as the temperature is increased up to 400° C. A larger amount of $CO_2$ produced indicates more oxygen coordinated on the catalyst surface of the sol-gel catalyst after water introduction.

Figure 6:
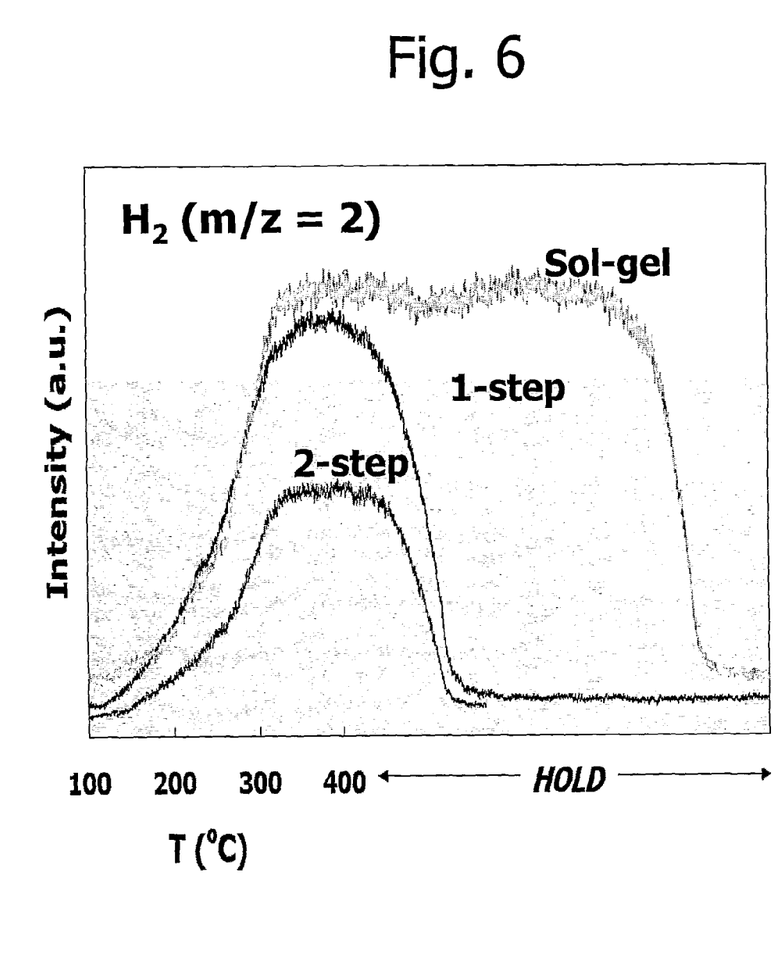
FIG. 6 is a graphical illustration of another TPReaction experiment, which compares the intensity of sol-gel Fe—Al—Cu catalysts and Fe—Al—Cu catalysts produced by co-precipitation (1-step) and co-precipitation-impregnation (2-step) according to one or more embodiments of the present invention.

As shown in FIG. 6, the introduction of $H_2O$ following CO-TPReaction also results in the formation of $H_2$ as previously observed in the $H_2O$-TPReaction experiments (FIG. 4a). This clearly indicates that the WGS reaction over Fe—Al—Cu catalysts occurs via a redox mechanism wherein the catalyst surface undergoes successive oxidation and reduction cycles to produce $H_2$ and $CO_2$, respectively.

It is noted that terms like "preferably," "generally," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the terms "substantially" and "about" are utilized herein to represent the inherent degree of uncertainty that may be attributed to any quantitative comparison, value, measurement, or other representation. The terms "substantially" and "about" is also utilized herein to represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

The invention claimed is:

1. A method of producing hydrogen by a water gas shift reaction comprising:
   providing a sol-gel Fe—Al—Cu catalyst;
   feeding a gaseous stream comprising carbon monoxide (CO), and steam ($H_2O$); and producing hydrogen ($H_2$) and $CO_2$ by oxidizing the CO with $H_2O$ in the presence of the sol-gel Fe—Al—Cu catalyst at a temperature of about 250 to about 400° C.

2. A method according to claim 1 wherein CO conversion is about 30% to about 60% by wt.

3. A method according to claim 1 wherein $H_2O$ and CO are provided at a molar ratio of about 1:1.

4. A method according to claim 1 wherein the sol-gel Fe—Al—Cu catalyst comprises a molar ratio of Fe/Cu of about 5:1 to about 25:1.

5. A method according to claim 1 wherein the sol gel Fe—Al—Cu catalyst comprises a molar ratio of Fe/Al of about 5:1 to about 15:1.

6. A method according to claim 1 wherein the sol-gel Fe—Al—Cu catalyst is substantially free of chromium (Cr).

7. A method according to claim 1 wherein the sol-gel Fe—Al—Cu catalyst is substantially free of Cr, the molar ratio of Fe/Cu is about 5:1 to about 25:1, and the molar ratio of Fe/Al is about 5:1 to about 15:1.

8. A method according to claim 1, wherein the sol-gel Fe—Al—Cu catalyst is produced by:
providing an organic iron precursor;
dissolving the organic iron precursor in a solvent solution;
adding an aqueous solution comprising aluminum nitrate and copper nitrate to the organic iron precursor-solvent solution;
precipitating a gel comprising Fe—Al—Cu by adding a base; and
drying the gel to form the Fe—Al—Cu catalyst.

* * * * *